US012699720B2

(12) United States Patent
Nageshwar et al.

(10) Patent No.: US 12,699,720 B2
(45) Date of Patent: Aug. 4, 2026

(54) ENTERPRISE APPLICATION QUERY ENRICHMENT FOR LANGUAGE MODELS

(71) Applicant: Google LLC, Mountain View, CA (US)

(72) Inventors: Nishant Nageshwar, Fremont, CA (US); Saraparajnavaj Bhairakdar, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/531,159

(22) Filed: Dec. 6, 2023

(65) Prior Publication Data

US 2024/0362257 A1 Oct. 31, 2024

Related U.S. Application Data

(60) Provisional application No. 63/462,812, filed on Apr. 28, 2023.

(51) Int. Cl.
*G06F 16/334* (2025.01)

(52) U.S. Cl.
CPC ................................. *G06F 16/334* (2019.01)

(58) Field of Classification Search
CPC ........................... G06F 16/334; G06F 16/3329
See application file for complete search history.

(56) References Cited

U.S. PATENT DOCUMENTS

| | | | |
|---|---|---|---|
| 8,935,277 B2 * | 1/2015 | Kuchmann-Beauger | ................... G06F 16/9024 |
| | | | 707/769 |
| 9,069,841 B1 | 6/2015 | Bailey et al. | |
| 10,282,419 B2 * | 5/2019 | Hebert | ................ G06F 16/3344 |
| 11,416,481 B2 | 8/2022 | Michels | |
| 2017/0060868 A1 * | 3/2017 | Rais Ghasem | ....... G06F 16/243 |
| 2017/0161319 A1 * | 6/2017 | Venkataraman | .... G06F 16/9535 |
| 2020/0104362 A1 | 4/2020 | Yang et al. | |
| 2022/0358168 A1 * | 11/2022 | Robert Jose | ...... G06F 16/90332 |
| 2023/0401203 A1 * | 12/2023 | Obeidi | ................. G06F 16/248 |
| 2024/0111795 A1 * | 4/2024 | Ogden | ..................... G06N 5/02 |
| 2024/0220489 A1 * | 7/2024 | Chouta | ................ G06F 16/243 |

OTHER PUBLICATIONS

International Search Report and Written Opinion for PCT Application No. PCT/US2023/082715, dated Mar. 15, 2024. 12 pages.

* cited by examiner

*Primary Examiner* — Kris E Mackes
(74) *Attorney, Agent, or Firm* — Lerner David LLP

(57) ABSTRACT

The technology described herein is directed to generating prompts for a language model, such as a large language model. In this regard, an enterprise interpretation model may receive a request for assistance with an enterprise application record. In response to receiving the request for assistance, the enterprise interpretation model may determine data corresponding to the record. Based on the determined data, the enterprise interpretation model may generate a query corresponding to the record. The query may include at least a subset of the data corresponding to the record. The query may then be provided to the language model for a response to be generated.

16 Claims, 7 Drawing Sheets

400

420

600

Hardware Accelerator 606

Datacenter 604

602N

602A

LLMs 602

ENTERPRISE APPLICATION QUERY ENRICHMENT FOR LANGUAGE MODELS

CROSS-REFERENCE TO RELATED APPLICATION

This application claims the benefit of the filing date of U.S. Provisional Patent Application No. 63/462,812 filed Apr. 28, 2023, the disclosure of which is hereby incorporated herein by reference.

BACKGROUND

Language models (LMs) include machine learning models, such as deep neural networks, recurrent neural networks, transformers, etc., trained to learn a probability distribution over sequences of words or tokens. LMs and other machine learning or statistical models are trained to produce text that is similar in structure to text presented in the training data. LMs can be used, for example, for simulating human-like responses to questions or requests for information. Large language models (LLMs) can be trained on large quantities of text data, including, for example, billions of words or tokens.

Conversational agents, such as chatbots, may leverage LMs to understand and communicate with a user through text or speech. The agents may be deployed to automatically assist users in performing a number of tasks, such as assisting the user with technical support.

A conversational agent may use LMs to identify requests of a user through provided input, for example, through natural language processing of a query received through speech or text. The relevancy of responses provided by the LMs is highly dependent on how the query is articulated. For instance, a user looking for information about ancient Greek "Spartans" may submit a query to an agent such as, "tell me more about the spartans." In response, the agent may return information provided by the LM about the American university Michigan State's athletic program. However, if the user submits a query to the agent, such as "tell me more about the Spartans from ancient Greece," the agent may receive, and return to the user, relevant information about the ancient Greek "Spartans."

In the context of enterprise applications, users may not have enough details available to provide a detailed query to get a relevant response. Further, there is a learning curve to using LMs and conversational agents. Users without a proper understanding of how LMs and conversational agents operate and/or enough training on how to frame queries may be unable to get relevant responses. For some users, the language the LMs and conversational agents operate in may not be their first language. Accordingly, users may not be able to generate specific queries framed well enough to get relevant responses.

BRIEF SUMMARY

Aspects of the disclosure are directed to methods, systems, and non-transitory computer readable media for automatically generating queries that will enable LMs, including LLMs, to provide relevant data to users of enterprise applications. A query may be generated which includes information, such as metadata, corresponding to records from the enterprise applications. In generating responses to the queries, the LMs may refer to data associated with the enterprise applications. In this regard, LMs may not retrieve data from external data sources, such as the internet. By limiting the sources of information to data associated with the enterprise application, the likelihood of the query response generated by the LM being relevant to the query increases.

One aspect of the disclosure is directed to a method for generating queries. The method comprises: receiving, by one or more processors, a request for assistance with an enterprise application record; determining, by the one or more processors, data corresponding to the record; and generating, by the one or more processors, a query corresponding to the record, wherein the query includes at least a subset of the data corresponding to the record.

In some instances, the method may further comprise providing, by the one or more processors, the query to a language model, large language model, or generative model.

In some instances, the query is generated by the one or more processors using an enterprise interpretation model. In some examples, the enterprise interpretation model is a natural language processing model, a language model, or a large language model. In some examples, the enterprise interpretation model is trained to generate queries that receive relevant responses from a large language model.

In some instances, the record is one of a plurality of unique records of an enterprise application. In some examples, the data corresponding to the record includes data within the record and data stored in association with an asset identified in the record. In some examples, the record is associated with an asset and comprises data corresponding to the asset. In some examples, the record further contains a task or problem associated with the asset.

Another aspect of the disclosure is directed to a system for generating queries. The system comprises one or more processors configured to: receive a request for assistance with an enterprise application record; determine data corresponding to the record; and generate a query corresponding to the record, wherein the query includes at least a subset of the data corresponding to the record.

In some instances, the one or more processors are further configured to provide the query to a large language model.

In some instances, the query is generated by the one or more processors using an enterprise interpretation model. In some examples, the enterprise interpretation model is a natural language processing model, a language model, or a large language model. In some examples, the enterprise interpretation model is trained to generate queries that receive relevant responses from a large language model.

In some instances, the record is one of a plurality of unique records of an enterprise application. In some examples, the data corresponding to the record includes data within the record and data stored in association with an asset identified in the record. In some examples, the record is associated with an asset and comprises data corresponding to the asset. In some examples, the record further contains a task or problem associated with the asset.

Another aspect of the disclosure is directed to a non-transitory computer readable medium storing instructions, that when executed by one or more processors, cause the one or more processors to: receive a request for assistance with an enterprise application record; determine data corresponding to the record; and generate a query corresponding to the record, wherein the query includes at least a subset of the data corresponding to the record.

In some instances, the instructions, when executed by the one or more processors, further cause the one or more processors to: provide the query to a large language model.

DETAILED DESCRIPTION

Figure 1:
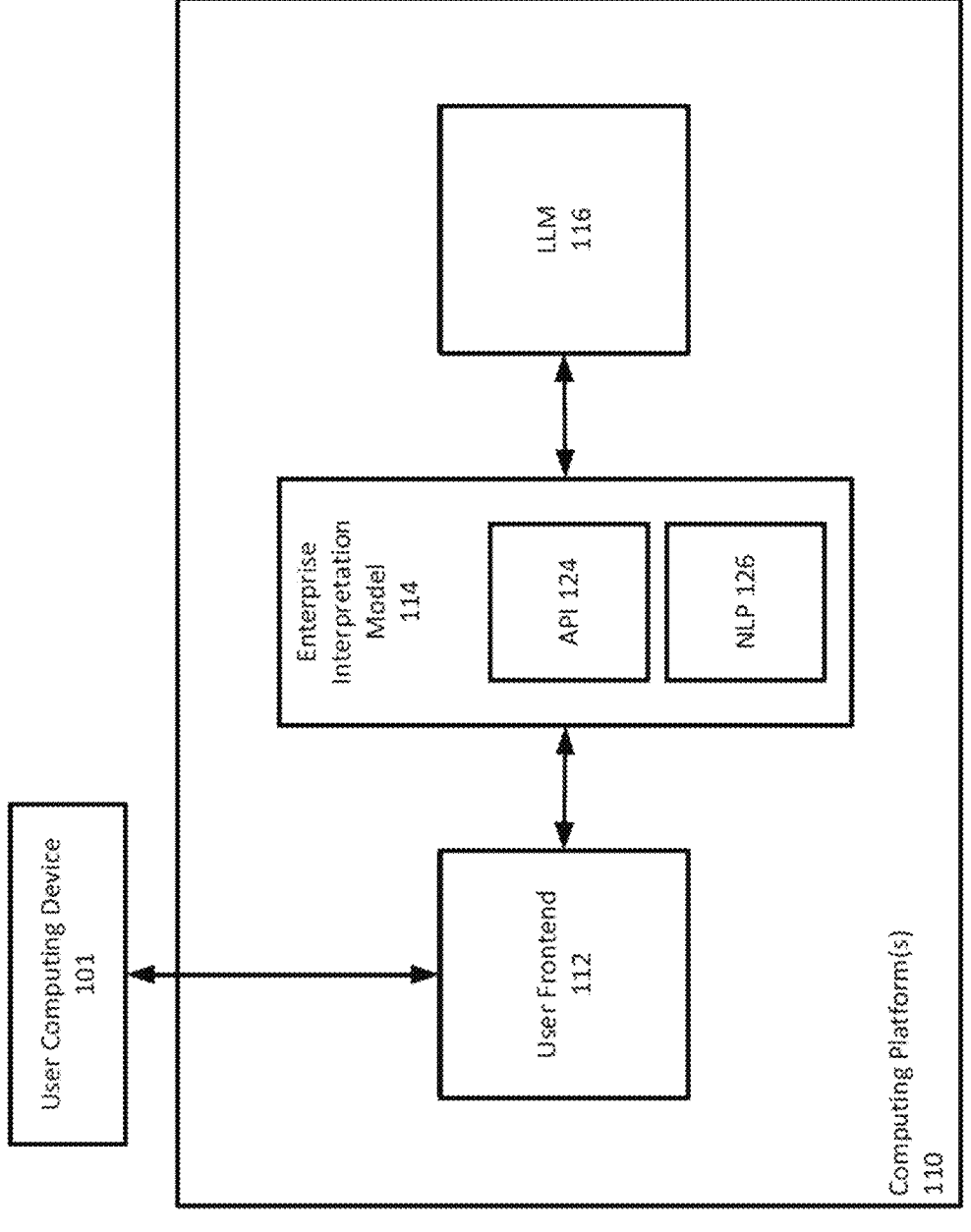
FIG. 1 is a block diagram of a computing platform for an enterprise interpretation model, in accordance with aspects of the disclosure.

The technology described herein is directed to an enterprise interpretation model capable of generating queries corresponding to records within an enterprise application. A query may be invoked from specific records in the enterprise application, such as a work order identifier, purchase order number, user identifier, or any other such unique records with the enterprise application. The queries may be generated by the enterprise interpretation model for subsequent input into a language model, such as a LLM. In this regard, the enterprise interpretation model may generate queries that are phrased in a format readily interpreted by the LLM and include enough information corresponding to the record for which the query is being generated to get focused, relevant responses back from the LLM.

The technology described herein is further directed to generating prompts for a language model, such as a large language model. In this regard, an enterprise interpretation model may receive a request for assistance with an enterprise application record. In response to receiving the request for assistance, the enterprise interpretation model may determine data corresponding to the record. Based on the determined data, the enterprise interpretation model may generate a query corresponding to the record. The query may include at least a subset of the data corresponding to the record. The query may then be provided to the language model for a response to be generated.

For example, an enterprise application may handle work orders which are each assigned a unique work order identifier. Each work order may be considered a record. Each work order may also include information about the problem or task associated with the work order identifier, as well as an asset identified in the work order.

A user of the enterprise application, such as an engineer assigned to handle work orders, may receive the work order, and may request an LLM provide additional information about how to handle the problem or task identified in the work order. When the user submits the request, an enterprise interpretation model may generate a query for submitting to the LLM. For instance, a work order may indicate "a low coolant error is occurring on generator 1." From within the enterprise application, such as within a work order interface, the user may request assistance with how to handle the work order from an LLM. Upon submitting the request for assistance, the enterprise interpretation model may look to metadata associated with the asset identified in the work order. In this example, the asset is "generator 1," and the metadata associated with the asset may include the make, model, year, etc., of generator 1. The metadata may be stored in association with the enterprise application.

As used herein, an asset may be anything, tangible or intangible, such as a task, job, purchase order, system, equipment, components, etc., that is managed by an enterprise application.

The enterprise interpretation model may generate a query for submitting to the LLM using the metadata associated with the asset and other text within the record such as the problem identified in the work order. For example, the enterprise interpretation model may generate a query such as "How to troubleshoot a low coolant error for a [year] [make] [model] generator," where [year], [make], and [model] are the make, model, and year of generator determined from the metadata associated with the asset, which, in the working example is generator 1.

The generated query may be returned to the user for entry into an LLM or the generated query may be automatically submitted by the enterprise interpretation model to the LLM. The LLM may then generate a response and return it directly to the user via the enterprise application, such as via the work order interface. Alternatively, or additionally, the LLM may generate a response and return it to the enterprise interpretation model, which in turn may return it to the user via the enterprise application.

The enterprise interpretation model may include a natural language processing model (NLP), language model (LM), large language model (LLM), or other such model capable of generating queries. In this regard, the enterprise interpretation model may be any of a variety of different machine learning or statistical models, such as deep neural networks, recurrent neural networks, transformers, etc. The term enterprise interpretation model, as used herein, will be understood to include the underlying model (e.g., NLP, LM, LLM, etc.), to avoid confusion with the LLM providing a response to the query. The enterprise interpretation model may be trained to receive data associated with a request for assistance from an LLM, such as data associated with an asset and associated metadata and text within an enterprise application. The enterprise interpretation model may be a generative model, NLP, LM, or LLM, for example, initially trained and then fine-tuned or retrained with input from users. Any of a variety of different machine learning or statistical models that can be trained as described herein may be used, not limited to natural language processing models, language models or large language models. For example, any of a variety of different generative AI models may be used that may be trained to receive one or more modalities of input, including text, image, video, audio, etc.

The enterprise interpretation model can be trained on relatively smaller datasets relative to other language models that generate natural language as output. As described herein, data corresponding to the enterprise application for which queries are being generated may be used to generate many different training examples consistent with real-world usage, as opposed to approaches for training LM to output natural language, which requires large amounts of natural language training data.

The enterprise interpretation model can be trained for handling query generation in enterprise applications of varying fields, such as telecommunications, retail transactions, procurement, maintenance, technical support, or any other fields where enterprise applications handle unique assets (e.g., work orders, purchase orders, tickets, etc.) The enterprise interpretation model may be fine-tuned with session data labeled with API calls for navigating through a query session with an LLM, allowing users to signal whether a response provided by the LLM to a query generated by the enterprise interpretation model was helpful and/or accurate.

Although the enterprise interpretation model described above is integrated into the enterprise application, the enterprise interpretation model may be a stand-alone application, a plug-in configured to integrate into the enterprise application, etc. In some instances, the technology described herein may be applied to other applications, other than enterprise applications.

FIG. 1 is a block diagram of computing platform(s) 110 on which the enterprise interpretation model 114 can be implemented. As shown, the computing platform 110 includes a user frontend 112, which may be the interface through which the user interacts with the enterprise interpretation model 114 and LLM 116. The enterprise interpretation model may include an Application Program Interface (API) 124 through which the user frontend 112 and/or LLM 116 can interact with the enterprise interpretation model 114. The enterprise interpretation model 114 may also include a NLP 126 configured to generate the queries. It should be understood that NLP 126 is merely an example model that the enterprise interpretation model 114 may include. As explained herein, other model types may be used.

The computing platform 110 may be implemented on one or more computing devices, such as one or more servers. For instance, the user frontend 112 may be implemented on a first server that executes the enterprise application, the enterprise interpretation model 114 may be executed by the first server or a second, different server, and the LLM 116 may be executed by the first, second, or a third, different server. Thus, the computing platform 110 can host a variety of different applications or services configured to receive user input, for example, a request for information from an LLM regarding an asset of an enterprise application. The computing platform 110 may also generate queries in response to the request and provide responsive information to the query as described herein.

User computing device 101 may be any of a variety of devices configured to communicate with the computing platform 110, for example over a network. Example user computing devices include a personal laptop, a personal mobile device or other handheld device, a wearable device, such as a helmet, glasses, a smartwatch, earbuds, etc., or a game console. Although user computing device 101 is shown separately from the computing platform 110, in some examples, portions of the computing platform 110 can be executed on the user computing device 101. For instance, the user computing device may execute the user frontend 112, enterprise interpretation model 114, and/or LLM 116.

The LLM 116 may be any model trained to implement natural language understanding (NLU), to identify relevant phrases or keywords from an inputted query and provide relevant responses. Relevancy can be contextual, based on the content of the query received. For example, if the query includes a prompt for troubleshooting a particular make of a component, the response may include responses for troubleshooting different models of the make of the component. However, if the query is for troubleshooting a particular year's model of a particular make of the component, the LLM 116 may return a response indicating how to troubleshoot that particular year's model of a particular make of the component.

Figure 2:
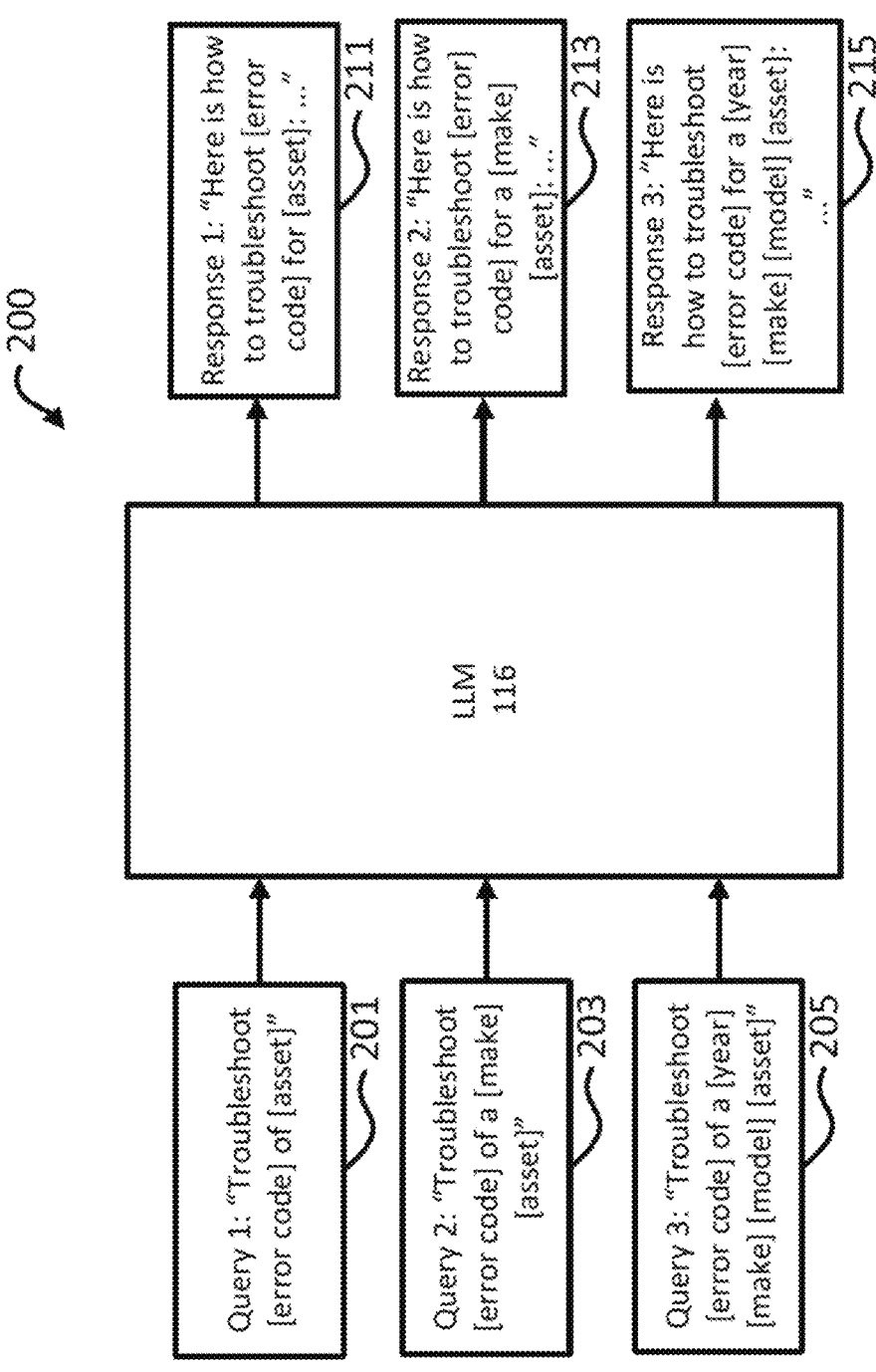
FIG. 2 is a block diagram illustrating responses generated by an LLM in response to queries, according to aspects of the disclosure.

For instance, and as illustrated in flow diagram 200 of FIG. 2, the relevancy of the response may be based on the query generated by the enterprise interpretation model, such as enterprise interpretation model 114. In this regard, the enterprise interpretation model may generate three queries based on the information received for three records being handled by a user. A first record (and associated data) may include information identifying an asset and an error code. A second record (and associated data) may include information identifying the make of the asset, the asset, and an error code. A third record (and associated data) may include information identifying the make of the asset, the model of the asset, the asset, the year of the asset, and an error code.

In response to receiving a request to generate a query for the first record, the enterprise interpretation model 114 may generate a first query 201, which asks for assistance troubleshooting the error code of the asset identified in the first record. In response to receiving a request to generate a query for the second record, the enterprise interpretation model 114 may generate a second query 203, which asks for assistance troubleshooting the error code of the asset having a particular make identified in the second record. In response to receiving a request to generate a query for the third record, the enterprise interpretation model 114 may generate a third query 205, which asks for assistance troubleshooting the error code of the year, make, and model of the asset identified in the third record.

In response to each request, the LLM 116 may return a response. As further shown in FIG. 2, the relevance of the responses is dependent on the information contained in the respective query. For instance, response 211 to the first query 201 provides troubleshooting information for a general asset (e.g., generator, motor, etc.) Response 213 to the second query 203 includes more relevant information, including troubleshooting information for a particular make of the asset of interest. Response 215 to the third query 205 includes yet more relevant information, including troubleshooting information for a particular year, make, and model of the asset of interest. Thus, the LLM 116 may provide more relevant information for queries containing more specifics. As such, the enterprise interpretation model 114 may be trained to generate queries containing a sufficient level of specifics, when possible.

Figure 3:
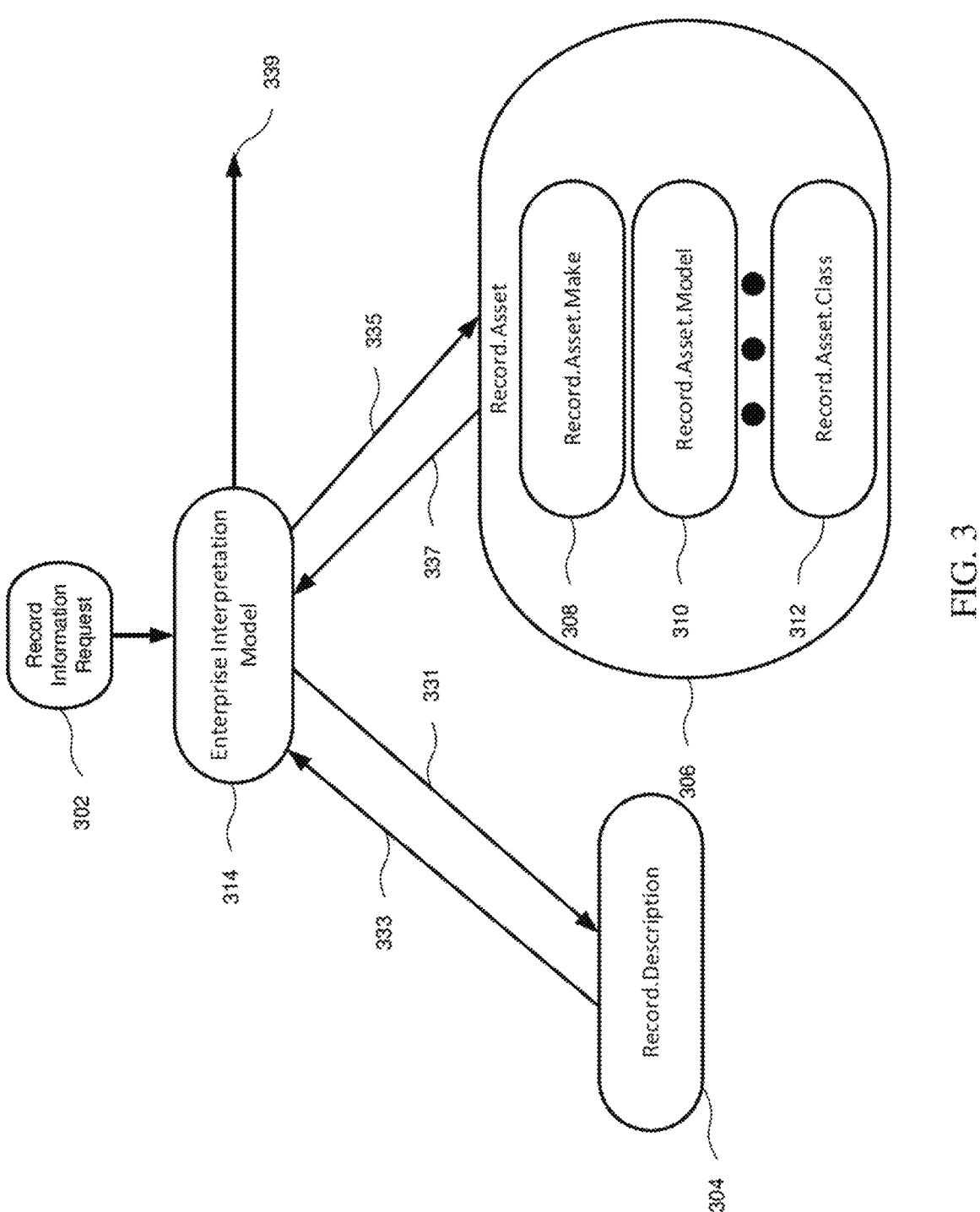
FIG. 3 is a flow diagram of an example process for generating queries by an enterprise interpretation model, according to aspects of the disclosure.
Figures 4A, 4B:
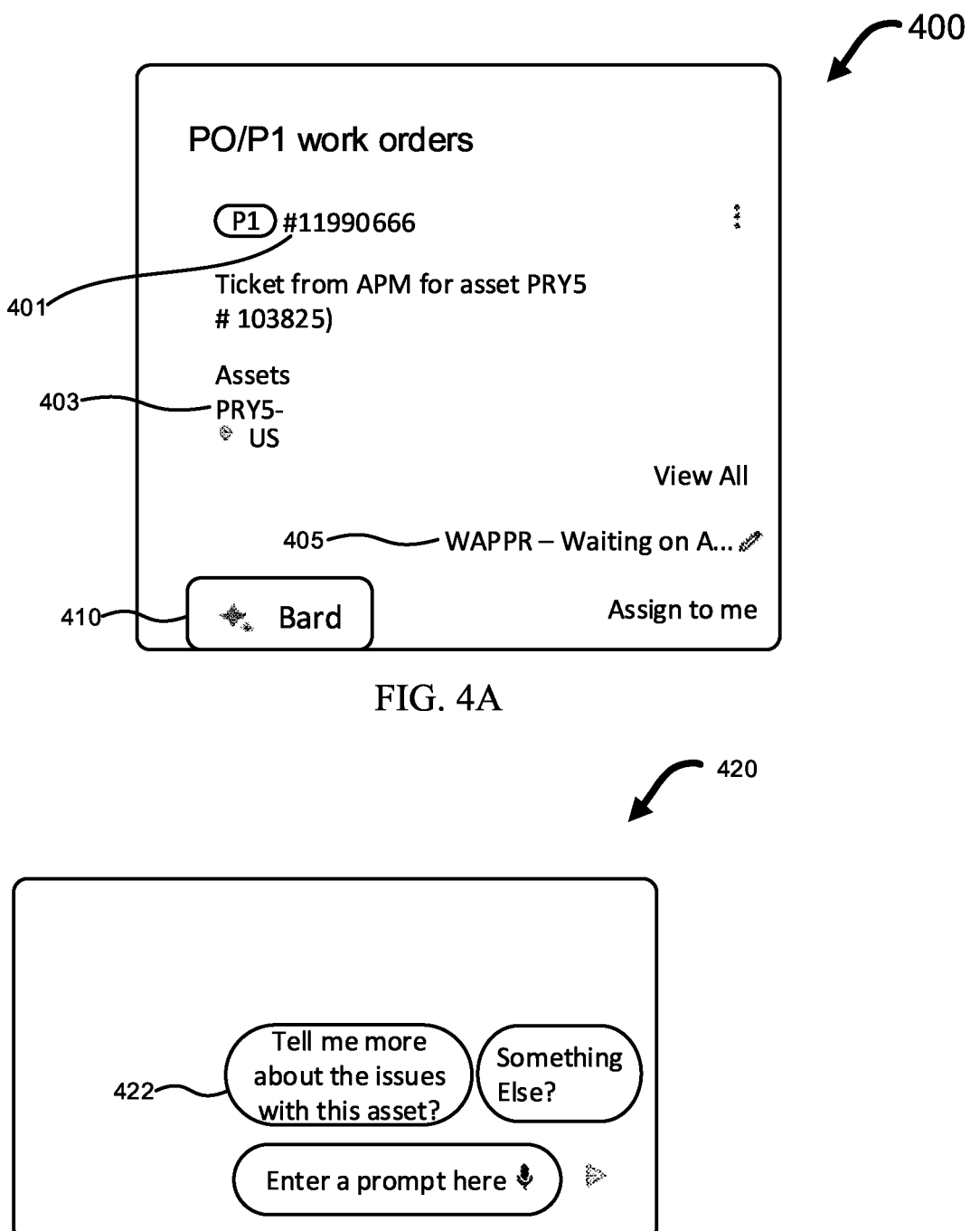
FIG. 4A is an example work order through which a request for assistance may be input, in accordance with aspects of the disclosure.
FIG. 4B is an example conversational agent through which a request for assistance may be input via a pre-drafted prompt, in accordance with aspects of the disclosure.

FIG. 3 is a block diagram illustrating the operation of an enterprise interpretation model 314, which may be compared with enterprise interpretation model 114. As shown, the enterprise interpretation model 314 may receive a request for information regarding a record 302. The request for information regarding the record 302 may be sent to the enterprise interpretation model 314 via an API, such as API 124. In this regard, a user of an enterprise application may receive a record, such as a work order, ticket, etc., that may identify a task or issue for an asset that needs to be handled. An example work order 400 within an enterprise application is shown in FIG. 4A. As shown, the work order 400 contains a record 401, an identification of the asset 403, and a description of the issue or task needing to be handled (referred to herein as "description" 405). Work order 400 is merely an example record for illustration, a record may include more or less information than found in work order 400. Additionally, metadata corresponding to the record and/or asset at issue may be stored in a database accessible to the enterprise interpretation model 314.

The work order 400 also contains a button 410 through which a user can request assistance from an LLM, such as LLM 116, for the work order. Although the example described herein has a user submitting a request for assistance from an LLM by selecting button 400 on work order 400, requests for assistance from an LLM may be submitted in many ways. For instance, a user may select a button, prompt, etc., from another interface of the enterprise application, the user may select a button, prompt, etc., from an interface of an application corresponding to the enterprise interpretation model, etc. Another option is the user may interact with a conversational agent, to request assistance with the work order from an LLM. In some instances, the conversational agent may have a selectable prompt which may result in a request for assistance from the LLM being entered. For instance, and as illustrated in FIG. 4B, a conversational agent 420 may have a pre-drafted prompt 422 stating "Tell me more about the issues with this Asset?" that a user may select to have input into the LLM.

After receiving the request for information regarding the record 302, the enterprise interpretation model 314 may determine and/or retrieve information regarding the record and asset associated with the request. In this regard, the enterprise interpretation model 314 may identify information associated with the record and/or asset, including information contained in the record and stored in association with the record, such as in a database. For instance, and again referring to FIG. 3, the enterprise interpretation model 314 may pull from the record (or data corresponding to the record), a description of the issue or task needing to be handled 304, as illustrated by arrows 331 and 333. Further, the enterprise interpretation model 314 may request and retrieve from the record or data corresponding to the record, information regarding the asset at issue, including the asset at issue 306 and information about the asset at issue, such as the make of the asset 308, model of the asset 310, class of the asset 312, or other such information, such as the year of the asset, as illustrated by arrow 335 and 337. Collectively, all the information gathered by the enterprise interpretation model 314 may be considered the "record data."

Using the record data, the enterprise interpretation model 314 may generate a prompt for submission to the LLM. For instance, the enterprise interpretation model 314 may generate a prompt based on a set of previously asked questions, such as a set of most asked previous questions. In the event a user chooses to type, speak, or otherwise input their own question, that question may get to a database. These manually input questions may be added to the set of previously asked questions that the enterprise interpretation model 314 bases the prompt on. If the same question, or similar questions, are asked enough to be one of the most commonly asked questions, the enterprise interpretation model may use the questions as a basis for a prompt. In some instances, the enterprise interpretation model may provide more than one pre-drafted prompt.

The generated prompt may be output to the LLM, as illustrated by arrow 339.

The LLM, such as LLM 116, may be trained only on data corresponding to the enterprise application, such as information associated with the assets of the enterprise application. For instance, the LLM may be trained to return responses to the prompts based on manuals corresponding to the assets within the enterprise application. In some examples, the LLM is trained entirely from data generated internally to, or otherwise controlled by, an enterprise and may be cordoned off from data external to, or not otherwise controlled by, the enterprise, such as data from the internet. In other examples, the LLM may be trained on data available from sources outside of the enterprise application, such as from the internet. However, as these sources of data may contain information about assets not within the enterprise application, the information provided by an LLM trained on such information may be less relevant. Thus, a user may be able to alternate between LLMs when requesting assistance. For instance, a user may select an option, such as a toggle, setting, etc., to query an LLM trained only on enterprise application data, an LLM trained on external data, and/or an LLM trained on both.

In some instances, users may provide feedback to the LLM, indicating whether the response was accurate and/or relevant. The LLM may be updated to provide more relevant, accurate information based on the feedback provided by the users. One example approach for updating an LLM based on feedback is reinforcement learning from human feedback (RLHF). In this regard, a user may have the option to provide feedback, such as whether they "like" or "dislike" the response from the LLM. In some instances, the user may provide information, written or verbal, explaining why the user liked or disliked the response. The LLM can be adjusted based on the provided information.

Figure 5:
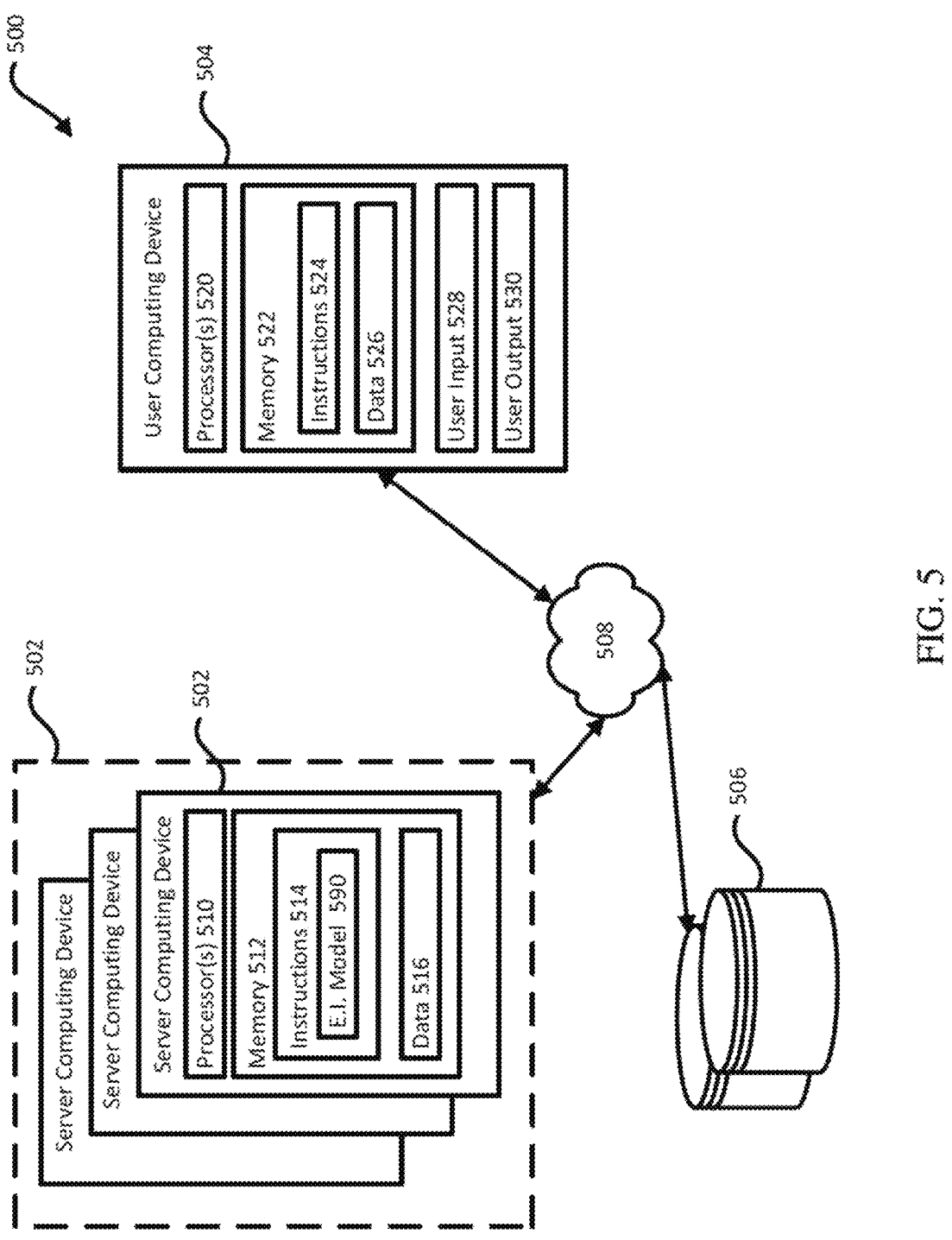
FIG. 5 is a block diagram of an example environment for implementing the enterprise application system, according to aspects of the disclosure.

FIG. 5 depicts a block diagram of an example environment 500 for implementing an enterprise interpretation model, such as enterprise interpretation model 114, an LLM, such as LLM 116, and an enterprise application. The system 500 can be implemented on one or more devices having one or more processors in one or more locations, such as in server computing device 502. Client computing device 504 and the server computing device 502 can be communicatively coupled to one or more storage devices 506 over a network 508. The storage devices 506 can be a combination of volatile and non-volatile memory and can be at the same or different physical locations than the computing devices 502, 504. For example, the storage devices 506 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 502 can include one or more processors 510 and memory 512. The memory 512 can store information accessible by the processors 510, including instructions 514 that can be executed by the processors 510. The memory 512 can also include data 516 that can be retrieved, manipulated, or stored by the processors 510. The memory 512 can be a type of non-transitory computer readable medium capable of storing information accessible by the processors 510, such as volatile and non-volatile memory. The processors 510 can include one or more central processing units (CPUs), graphic processing units (GPUs), field-programmable gate arrays (FPGAs), and/or application-specific integrated circuits (ASICs), such as tensor processing units (TPUs).

The instructions 514 can include one or more instructions that, when executed by the processors 510, cause the one or more processors to perform actions defined by the instructions 514. The instructions 514 can be stored in object code format for direct processing by the processors 510, or in other formats including interpretable scripts or collections of independent source code modules that are interpreted on demand or compiled in advance. The instructions 514 can include instructions for implementing an enterprise interpretation model 590, which can correspond to enterprise interpretation model 114. The enterprise interpretation model 590 can be executed using the processors 510, and/or using other processors remotely located from the server computing device 502.

The data 516 can be retrieved, stored, or modified by the processors 510 in accordance with the instructions 514. The data 516 can be stored in computer registers, in a relational or non-relational database as a table having a plurality of different fields and records, or as JSON, YAML, proto, or XML documents. The data 516 can also be formatted in a computer-readable format such as, but not limited to, binary values, ASCII, or Unicode. Moreover, the data 516 can include information sufficient to identify relevant information, such as numbers, descriptive text, proprietary codes, pointers, references to data stored in other memories, including other network locations, or information that is used by a function to calculate relevant data.

The client computing device 504 can also be configured similarly to the server computing device 502, with one or more processors 520, memory 522, instructions 524 (such as the enterprise application, which may additionally or alternatively, be executed by the server computing device 502), and data 526. The client computing device 504 can also include a user input 528 and a user output 530. The user input 528 can include any appropriate mechanism or technique for receiving input from a user, such as keyboard, mouse, mechanical actuators, soft actuators, touchscreens, microphones, and sensors.

The server computing device 502 can be configured to transmit data to the client computing device 504, and the client computing device 504 can be configured to display at least a portion of the received data on a display implemented as part of the user output 530. The user output 530 can also be used for displaying an interface between the client computing device 504 and the server computing device 502. The user output 530 can alternatively or additionally include one or more speakers, transducers or other audio outputs, a haptic interface or other tactile feedback that provides non-visual and non-audible information to the platform user of the client computing device 504.

Although FIG. 5 illustrates the processors 510, 520 and the memories 512, 522 as being within the computing devices 502, 504, components described herein can include multiple processors and memories that can operate in different physical locations and not within the same computing device. For example, some of the instructions 514, 524 and the data 516, 526 can be stored on a removable SD card and others within a read-only computer chip. Some or all of the instructions and data can be stored in a location physically remote from, yet still accessible by, the processors 510, 520. Similarly, the processors 510, 520 can include a collection of processors that can perform concurrent and/or sequential operation. The computing devices 502, 504 can each include one or more internal clocks providing timing information, which can be used for time measurement for operations and programs run by the computing devices 502, 504.

The server computing device 502 can be connected over the network 508 to a datacenter (not shown) housing any number of hardware accelerators. The datacenter can be one of multiple datacenters or other facilities in which various types of computing devices, such as hardware accelerators, are located. Computing resources housed in the datacenter can be specified for deploying large language models (LLMs), such as for natural language processing, as described herein.

The server computing device 502 can be configured to receive requests to process data from the client computing device 504 on computing resources in the datacenter 532. For example, the environment 500 can be part of a computing platform configured to provide a variety of services to users, through various user interfaces and/or application programming interfaces (APIs) exposing the platform services. The variety of services can include generating one or more LLMs, such as those described herein. The client computing device 504 can transmit data specifying requests for assistance. The server computing system 502 can receive the request, and in response, generate a query and output a response. In this regard, server computing device 502 may execute by the LLM and enterprise interpretation model. Alternatively, the enterprise interpretation model and LLM may be executed by different servers. Alternatively, or additionally, the enterprise interpretation model and/or LLM may be executed by the user computing device.

As other examples of potential services provided by a platform implementing the environment 500, the server computing device 602 can maintain a variety of LLMs available at a datacenter. For example, the server computing device 502 can maintain different families for deploying LLMs on the various types of TPUs and/or GPUs housed in the datacenters or otherwise available for processing.

Figure 6:
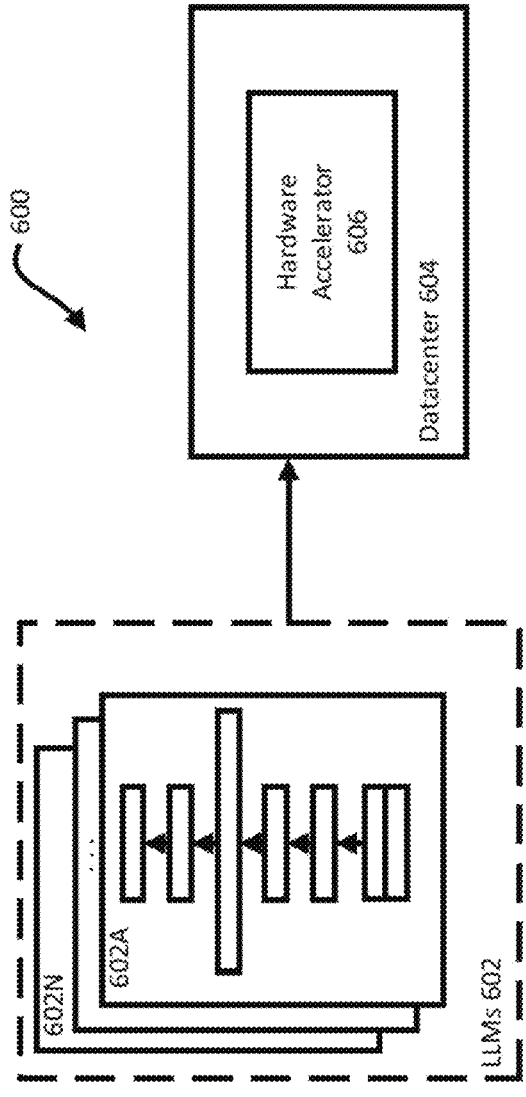
FIG. 6 is a block diagram of an example environment for implementing LLMs within a datacenter, according to aspects of the disclosure.

FIG. 6 depicts a block diagram 600 illustrating one or more LLM architectures 602, more specifically 602A-N for each architecture, for deployment in a datacenter 604 housing a hardware accelerator 606 on which the deployed LLMs 602 will execute, such as for providing enterprise interpretation model or LLM services. The hardware accelerator 606 can be any type of processor, such as a CPU, GPU, FPGA, or ASIC such as a TPU.

An architecture 602 of a LLM can refer to characteristics defining the LLM, such as characteristics of layers for the LLM, the nature of input to the layers, how the layers process the input, or how the layers interact with one another. The architecture 602 of the LLM can also define types of operations performed within each layer. One or more LLM architectures 602 can be generated that can output results, such as for natural language processing.

Referring back to FIG. 5, the devices 502, 504 and the datacenter can be capable of direct and indirect communication over the network 508. For example, using a network socket, the client computing device 504 can connect to a service operating in the datacenter through an Internet protocol. The devices 502, 504 can set up listening sockets that may accept an initiating connection for sending and receiving information. The network 508 itself can include various configurations and protocols including the Internet, World Wide Web, intranets, virtual private networks, wide area networks, local networks, and private networks using communication protocols proprietary to one or more companies. The network 508 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network 508, in addition or alternatively, can also support wired connections between the devices 502, 504 and the datacenter, including over various types of Ethernet connection.

Although a single server computing device 502 and client computing device 504, are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing LLMs, and any combination thereof.

Figure 7:
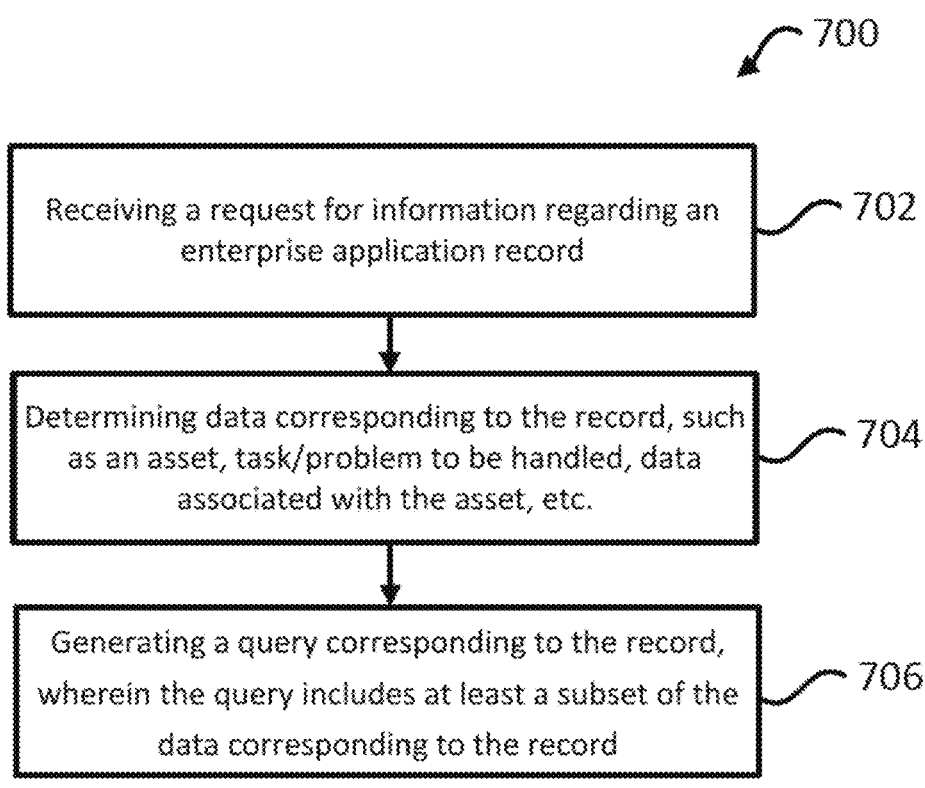
FIG. 7 is a flow diagram illustrating an example process for generating a query, in accordance with aspects of the disclosure.

FIG. 7 illustrates an example flow diagram 700 for generating a query. As shown in block 702, a request for information regarding an enterprise application record is received. After receiving the request, data corresponding to the record, such as an asset, task/problem to be handled, data associated with the asset, etc., may be determined, as shown in block 704. A query corresponding to the record, wherein the query includes at least a subset of the data corresponding to the record, may then be generated, as shown in block 706. The query may subsequently be submitted to an LM or LLM for a response to be generated.

The features described herein may result in improvement in handling of records by users of the enterprise application, as the users may receive relevant information quickly from the LLM then if they were to manually formulate a query. Moreover, receiving relevant assistance from the LLM may allow more junior users to handle records, thereby freeing up senior users for higher priority work.

In addition, by limiting the sources of data for the LLM, the "latest and greatest" industry manuals available to the enterprise application may be used by the LLM to provide more accurate and relevant query responses. In addition, by receiving user feedback, the LLM may be further improved to provide information relevant to the enterprise application.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification, the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems. One or more processors in one or more locations can perform the operations shown in the drawings and recited in the claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating queries comprising:

receiving, by one or more processors, via a user interface of an enterprise application, a request for assistance with handling a task identified in an enterprise application record, the record comprising a work order or purchase order regarding an asset;

determining, by the one or more processors using an enterprise interpretation model comprising a first machine learning model, data corresponding to the record to generate a first query;

generating, by the one or more processors using the enterprise interpretation model, a second query for a second machine learning model trained to provide assistance with the enterprise application, wherein the second query is generated using the data corresponding to the record and the first query automatically obtained using the first machine learning model, and the second query is generated with asset-specific technical attributes to form a structured prompt configured to prompt a response from the second machine learning model that provides focused information tailored to the asset identified in the enterprise application record in response to the request for assistance;

providing, by the one or more processors, the second query to the second machine learning model; and outputting, by the one or more processors, via the user interface of the enterprise application, the response from the second machine learning model.

2. The method of claim 1, wherein the second machine learning model is a language model, large language model, or generative model.

3. The method of claim 1, wherein the first machine learning model is a natural language processing model, a language model, or a large language model.

4. The method of claim 1, wherein the record is one of a plurality of unique records of the enterprise application.

5. The method of claim 4, wherein the data corresponding to the record includes data within the record and data stored in association with an asset identified in the record.

6. The method of claim 4, wherein the record is associated with an asset and comprises data corresponding to the asset.

7. The method of claim 6, wherein the record further contains a task or problem associated with the asset.

8. A system for generating queries comprising:

one or more processors configured to:

receive, via a user interface of an enterprise application, a request for assistance with handling a task identified in an enterprise application record, the record comprising a work order or purchase order regarding an asset;

determine, using an enterprise interpretation model comprising a first machine learning model, data corresponding to the record to generate a first query;

generate, using the enterprise interpretation model, a second query for a second machine learning model trained to provide assistance with the enterprise application, wherein the second query is generated using the data corresponding to the record and the first query automatically obtained using the first machine learning model, and the second query is generated with asset-specific technical attributes to form a structured prompt configured to prompt a response from the second machine learning model that provides focused information tailored to the asset identified in the enterprise application record in response to the request for assistance;

provide the second query to the second machine learning model; and output, via the user interface of the enterprise application, the response from the second machine learning model.

9. The system of claim 8, wherein the second machine learning model is a language model, large language model, or generative model.

10. The system of claim 8, wherein the first machine learning model is a natural language processing model, a language model, or a large language model.

11. The system of claim 8, wherein the record is one of a plurality of unique records of the enterprise application.

12. The system of claim 11, wherein the data corresponding to the record includes data within the record and data stored in association with an asset identified in the record.

13. The system of claim 11, wherein the record is associated with an asset and comprises data corresponding to the asset.

14. The system of claim 13, wherein the record further contains a task or problem associated with the asset.

15. A non-transitory computer readable medium storing instructions, that when executed by one or more processors, cause the one or more processors to:

receive, via a user interface of an enterprise application, a request for assistance with handling a task identified in an enterprise application record, the record comprising a work order or purchase order regarding an asset;

determine, using an enterprise interpretation model comprising a first machine learning model, data corresponding to the record to generate a first query;

generate, using the enterprise interpretation model, a second query for a second machine learning model trained to provide assistance with the enterprise application, wherein the second query is generated using the data corresponding to the record and the first query automatically obtained using the first machine learning model, and the second query is generated with asset-specific technical attributes to form a structured prompt configured to prompt a response from the second machine learning model that provides focused information tailored to the asset identified in the enterprise application record in response to the request for assistance;

provide the second query to the second machine learning model; and output, via the user interface of the enterprise application, the response from the second machine learning model.

16. The non-transitory computer readable medium of claim 15, wherein the first and second machine learning models are language models, large language models, and/or generative models.

* * * * *